(12) United States Patent
Brucke

(10) Patent No.: US 9,103,851 B2
(45) Date of Patent: Aug. 11, 2015

(54) METHOD AND DEVICE FOR CALIBRATING ACCELERATION AND FORCE SENSORS

(75) Inventor: Martin Brucke, Dresden (DE)

(73) Assignee: SPEKTRA Schwingungstechnik und Akustik GmbH Dresden, Dresden (DE)

( * ) Notice: Subject to any disclaimer, the term of this patent is extended or adjusted under 35 U.S.C. 154(b) by 545 days.

(21) Appl. No.: 12/812,511

(22) PCT Filed: May 18, 2009

(86) PCT No.: PCT/DE2009/075023
§ 371 (c)(1),
(2), (4) Date: Jul. 12, 2010

(87) PCT Pub. No.: WO2009/143838
PCT Pub. Date: Dec. 3, 2009

(65) Prior Publication Data
US 2010/0281944 A1   Nov. 11, 2010

(30) Foreign Application Priority Data

May 29, 2008   (DE) .......................... 10 2008 025 866

(51) Int. Cl.
*G01P 21/00* (2006.01)
*G01L 25/00* (2006.01)

(52) U.S. Cl.
CPC ................ *G01P 21/00* (2013.01); *G01L 25/00* (2013.01)

(58) Field of Classification Search
CPC ................................ G01G 23/01; G01P 21/00
USPC ................................... 73/1.15, 1.08
See application file for complete search history.

(56) References Cited

U.S. PATENT DOCUMENTS

| | | | |
|---|---|---|---|
| 3,830,091 A | 8/1974 | Sinsky | |
| 4,292,835 A * | 10/1981 | Bickford | ........................ 73/1.15 |
| 5,000,030 A | 3/1991 | Umeda et al. | |
| 7,343,776 B2 | 3/2008 | Umeda et al. | |
| 2007/0153627 A1 * | 7/2007 | Tulett et al. | ..................... 367/55 |

* cited by examiner

*Primary Examiner* — Laura Martin
*Assistant Examiner* — Alex Devito
(74) *Attorney, Agent, or Firm* — Heslin Rothenberg Farley & Mesiti P.C.

(57) ABSTRACT

The stimulation of waves in bars, in particular at high amplitudes, is used for the calibration of acceleration and force sensors. A method and a device for calibrating acceleration and force sensors employing a Hopkinson bar for controlled influencing of the signal form, the signal amplitude and the pulse duration of the signals over a large amplitude range, is provided. A reference sensor and the sensor for calibration are arranged on the Hopkinson bar. At the end of the Hopkinson bar opposite the sensors, the stimulation is carried out by an electromechanical actuator for converting an electrical signal into a mechanical force. The electromechanical actuator may be controlled by a control and regulation electronic circuit. A targeted influence and change in the acceleration and force pulse form can be achieved.

10 Claims, 2 Drawing Sheets

METHOD AND DEVICE FOR CALIBRATING ACCELERATION AND FORCE SENSORS

BACKGROUND OF THE INVENTION

Field of the Invention

The invention relates to a method and device for exciting waves in bars in order to calibrate acceleration sensors and force sensors, in particular with high amplitudes. A sensor such as this is an electromechanical transducer which converts the mechanical variable acceleration or force to an electrically measurable signal, for example charge or voltage. A calibration must be carried out in order to determine the transfer function of the sensor.

Various devices are known for calibrating acceleration sensors. Devices and methods for calibrating oscillation and shock sensors are described in ISO 16063. For calibration with acceleration amplitudes of >1000 m/s$^2$, it is necessary to use signals in the form of shocks, that is to say signals which are limited in time. The generally known hammer and anvil principle, which is based on two solid bodies striking one another, operates satisfactorily up to acceleration amplitudes of 5000 m/s$^2$. The Hopkinson bar principle must be used in order to produce higher accelerations, for high-quality calibrations. The described calibration method is explained in ISO 16063-13. Static methods are normally used to calibrate force sensors. This means that the sensor is loaded with a static weight force. The calibration of force sensors by means of signals which vary over time and are produced by a Hopkinson bar represents a novelty.

In principle, three different methods are known for calibration by means of a Hopkinson bar. These different methods relate to the reference sensor systems that are used.

The acceleration at the bar end can be measured by means of an optical measurement system (for example laser vibrometer) or a reference acceleration sensor or force sensor. A further method for calibration is to measure the strain on the bar by means of strain gauges. The acceleration of the bar end can be calculated from the bar strain.

The Hopkinson bar principle is based on the fact that a mechanical wave propagates in a long thin bar. The reflection of the wave at a free bar end results in a movement, which produces the acceleration or force required for calibrating the sensors. As a result of the characteristics of a long thin bar, these accelerations and forces can reach very high amplitudes (>1 000 000 m/s$^2$ and >100 000 N, respectively).

In the case of a traditional Hopkinson bar, a solid body, for example a steel ball, was fired at one end of the bar, thus resulting in a mechanical force shock. This force shock triggers a longitudinal extensional wave in the bar, and can propagate along the bar. The profile of the strain over time as well as the acceleration and force/time profile at the bar end are defined by the force/time profile of the force shock at the bar start. For example, large steel balls excite a very narrow frequency spectrum. As the ball diameter becomes smaller, the frequency spectra become broader. However, the maximum amplitudes increase greatly as the ball diameter becomes larger.

The main disadvantages of the traditional Hopkinson bar are:
It is not possible to influence the acceleration signal form.
The impulse duration of the acceleration is predetermined by the shock partner and can therefore be influenced only with difficulty.
The reproducibility of the acceleration signals and therefore the calibration result are restricted by wear to the shock partners.
Restricted lower amplitude range from about >5000 m/s$^2$.

U.S. Pat. No. 5,000,030 A describes a method and an apparatus for measuring the dynamic characteristics of a shock accelerometer. A reference sensor system is located on a Hopkinson bar, and the sensor to be calibrated is located at its end. A mechanical shock can also be excited, inter alia, by means of a piezoelectric element. There is no deliberate influence on the signal form, the signal amplitude or the pulse duration of the signals.

A test system for calibrating acceleration sensors is described in U.S. Pat. No. 3,830,091 A, in which electromechanical actuators which are mounted on an aluminum bar at the side produce resonant oscillations in the bar by means of open-loop and closed-loop electronics, and the acceleration sensor to be tested as well as a reference acceleration sensor are mounted at one end of the bar. Harmonic accelerations can be produced in this test system. However, the frequencies of the acceleration can be set only to integer multiples of a fundamental frequency (for example 1 kHz, 2 kHz, 3 kHz . . . ). The achievable acceleration amplitude is only about 3000 m/s$^2$.

BRIEF SUMMARY OF THE INVENTION

The object of the invention is to develop a method and a device for calibrating acceleration and force sensors by means of a Hopkinson bar, which makes it possible to deliberately influence the signal form, the signal amplitude and the pulse duration of the signals over a wide amplitude range. The device should have a simple design, and should operate reliably, safely and with little maintenance.

The device according to the invention for calibrating acceleration and force sensors uses a reference sensor system which is normally formed on a Hopkinson bar. The reference sensor system may be an optical measurement system (for example a laser vibrometer) or a reference sensor. A further method for calibration is to measure the strain on the bar by means of strain gauges. The acceleration or the force in the bar end can be calculated from the bar strain.

One Hopkinson bar, which is normally used, is a metal bar with a length of about 2 m to 4 m and with a thickness of about 18 mm to 30 mm.

The sensor to be calibrated is attached to the end of the Hopkinson bar. An electromechanical actuator attached to the opposite end of the Hopkinson bar is used to excite an acceleration or force impulse.

A counterweight is attached to the electromechanical actuator opposite the Hopkinson bar, which counterweight must be much shorter than the bar length and must have a mass of more than 1/100 of the bar mass. This counterweight has the function of introducing the actuator force into the bar.

The electromechanical actuator is connected via a control line to open-loop and closed-loop control electronics.

The electromechanical actuator will preferably be a piezoelectric actuator or else a magnetostrictive actuator. A magnetostrictive actuator can be coupled to the bar very easily, but is considerably less efficient than a piezoelectric actuator.

A control line can lead from the reference sensor system to the open-loop and closed-loop control electronics.

The device can be used to calibrate force or acceleration sensors. In order to calibrate acceleration sensors, the sensor must be mounted on the free bar end. In order to calibrate force sensors, the sensor must be mounted together with a coupling mass on the free bar end.

The device according to the invention operates as follows:

The described disadvantages of known calibration methods by means of Hopkinson bars result from the fact that the wave in the bar is initiated by a mechanical force shock. The present invention is based on the mechanical force shock being replaced by an alternative method for exciting waves in the bar. The aim of this method is to convert an electrical drive signal to a defined force shock. Transducers of this type can generally be referred to as actuators. In particular, electromechanical actuators may be used to calibrate acceleration and force sensors by means of the device according to the invention, which electromechanical actuators have a wide force dynamic range (1 mN to 5 kN) and a wide useable frequency range (>10 kHz).

The acceleration and force impulse form can be controlled by measuring the respective variable on the reference sensor system. The measurement variable is transmitted to close-loop control electronics, and the drive signals of the electromechanical actuator can be deliberately predistorted.

If the Hopkinson bar is brought to the resonant state at its longitudinal natural frequencies, a maximum of the acceleration or force amplitude occurs at the bar end, if the excitation power is constant. This allows large acceleration and force amplitudes to be achieved in a particularly energy-efficient manner.

The acceleration and force amplitude at the end of the bar are maximized by superimposition of waves. The force and acceleration amplitude is increased in steps by repeatedly supplying energy in the form of renewed excitation of the Hopkinson bar, by means of the electromechanical actuator.

The invention makes it possible to overcome the disadvantages of the traditional calibration method by means of a Hopkinson bar.

The advantages of the invention are that the acceleration signal form can be influenced electrically. The pulse duration of the acceleration signal can also be influenced electrically. The invention makes it possible to influence the signal form (harmonic signals, pulsed signals), the signal amplitude (typically 20 m/s² to 100 000 m/s²) and the pulse duration (typically 50 µs to 500 µs) of the signals.

There is virtually no wear, thus improving the reproducibility of the acceleration signals and of the calibration result.

Furthermore, the capability for simple automation of the calibration runs and a more energy-efficient way of operation in comparison to a conventional calibration device may be mentioned as advantageous characteristics of the calibration device.

The invention will be explained in more detail in the following text with reference to two exemplary embodiments. In the figures:

DESCRIPTION OF THE INVENTION

Figure 1:
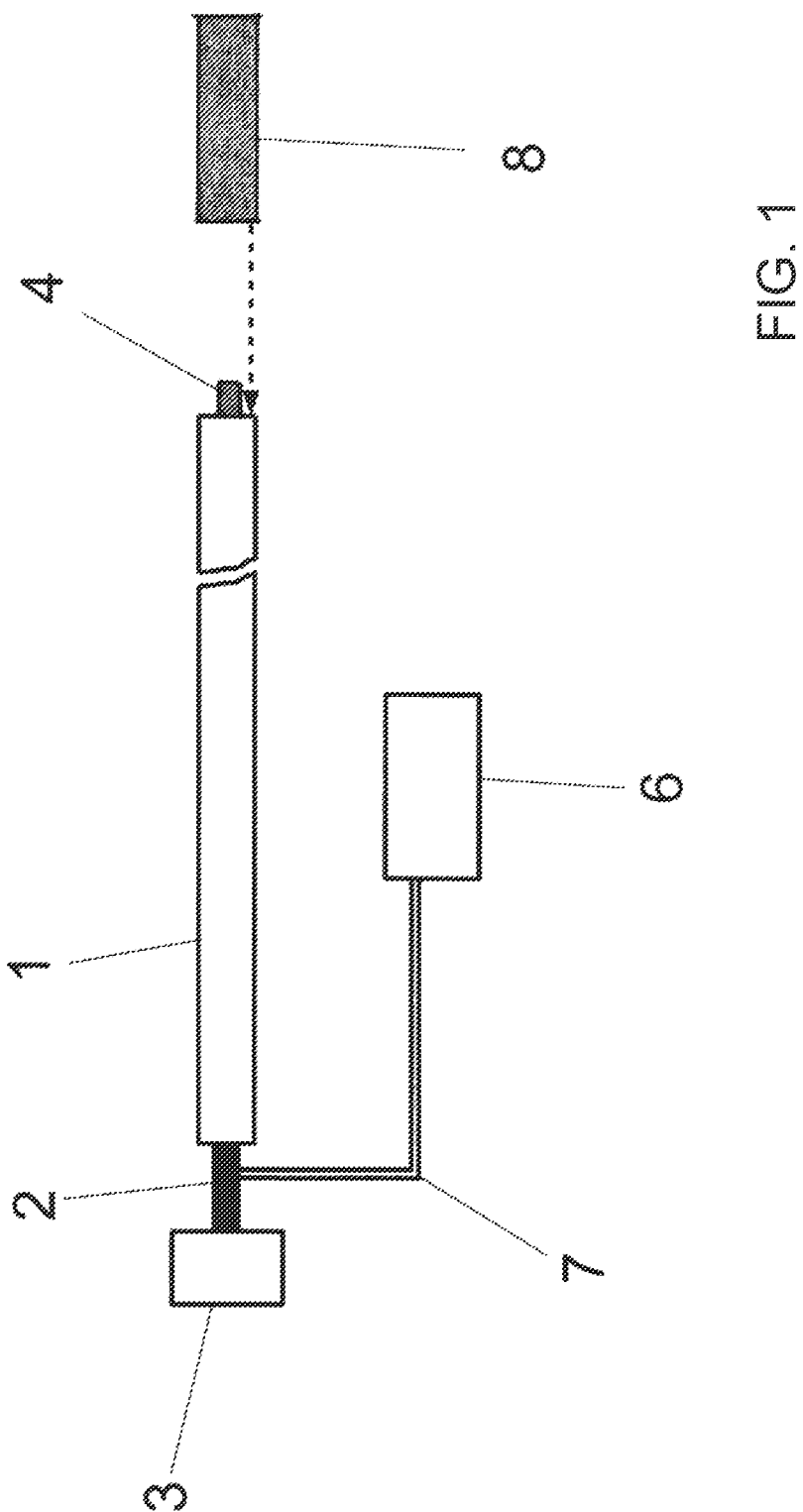
FIG. 1 shows a calibration device with a laser vibrometer as a reference sensor system.

FIG. 1 shows a device for calibrating acceleration sensors. The device comprises a Hopkinson bar 1, which is in the form of a metallic cylindrical bar with a length of 2 m and a diameter of 20 mm. A piezoelectric actuator 2 is connected to the Hopkinson bar 1 with a force fit at the left-hand start of the bar. A cylindrical metallic counterweight 3 with a diameter of 50 mm and a length of 30 mm is adhesively bonded to the actuator 2. The sensor 4 to be calibrated is mounted at the right-hand end of the bar. The reference sensor system 8 is in the form of a laser. The open-loop and closed-loop control electronics 6 control the piezoelectric actuator 2 via a control line 7.

Figure 2:
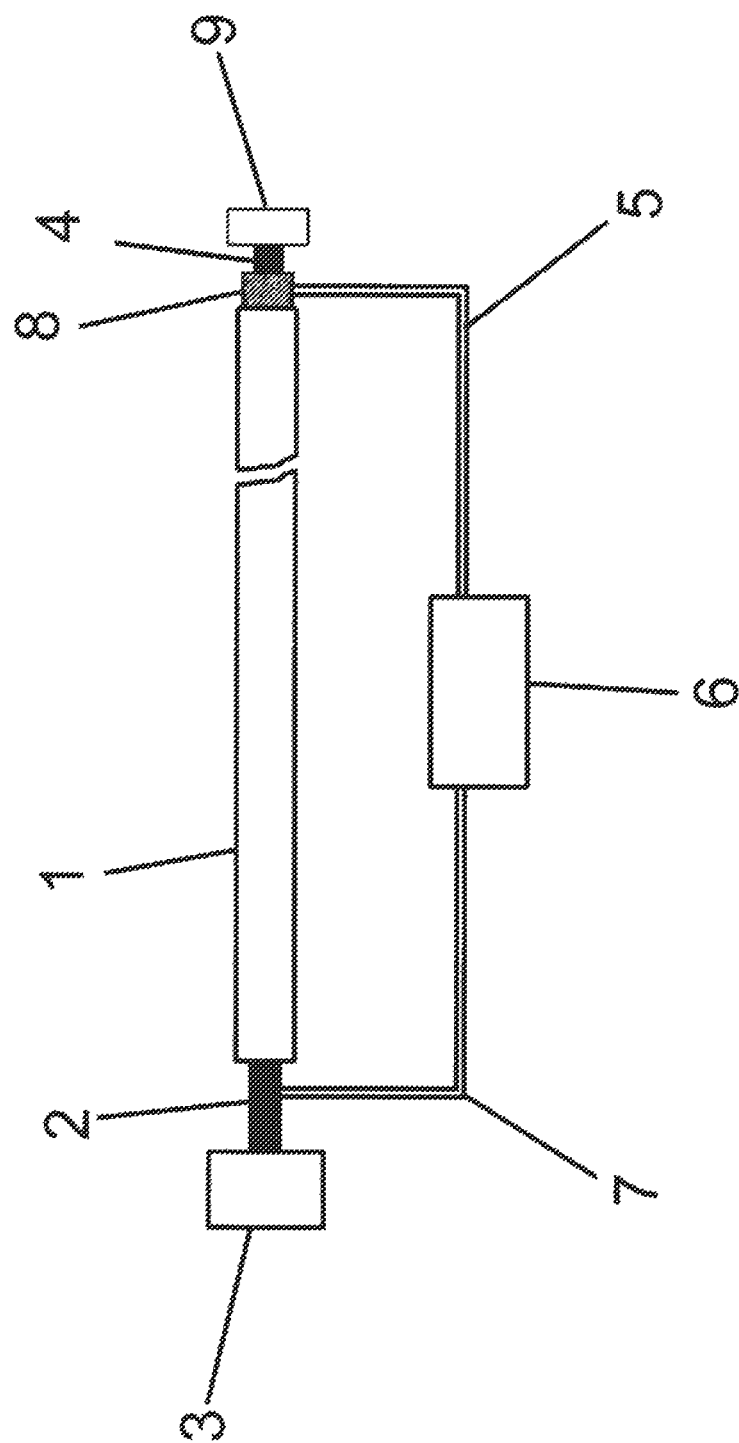
FIG. 2 shows a calibration device with a force sensor as a reference sensor system.

FIG. 2 illustrates a device for calibrating force sensors. The device comprises a Hopkinson bar 1, which is normally in the form of a metallic cylindrical bar with a length of 2 m and a diameter of 20 mm. A piezoelectric actuator 2 is connected with a force fit to the Hopkinson bar 1 at the left-hand start of the bar. A cylindrical metallic counterweight 3 has a diameter of 50 mm and a length of 30 mm, and is adhesively bonded, that is to say integrally connected, to the piezoelectric actuator 2. The sensor 4 to be calibrated, the reference sensor 8 and the coupling mass 9 are mounted on the right-hand end of the bar. The open-loop and closed loop control electronics 6 control the piezoelectric actuator 2 via a control line 7.

The signals from the sensor 4 to be calibrated and from the reference sensor system 8 are supplied to open-loop and closed-loop control electronics 6 via control line 5. Defined waves are produced in the bar by driving the piezoelectric actuator 2 with defined electrical signals. Defined acceleration-time and force time signals can thus be produced from the reflection of the waves at the right-hand end of the bar.

The signals at the right-hand end of the bar can be influenced deliberately by varying the electrical drive signals at the piezoelectric actuator 2. The invention therefore makes it possible to influence both the signal form (harmonic signals, pulsed signals), the signal amplitude (typically 20 m/s² to 100 000 m/s²) and the pulse duration (typically 50 µs to 500 µs) of the signals.

In order to produce a defined nominal signal at the bar end, the actual signals of the reference sensor system can be used in order to compare them with the nominal signal. Predistortion of the drive signals for the actuator can be calculated by means of suitable mathematical methods, such that the nominal signal is produced at the bar end. This makes it possible to produce calibration signals which are matched to the respective sensor to be calibrated.

The continuum characteristics of the bar can be used in order to achieve particularly high signal amplitudes at the right-hand end of the bar.

On the one hand, the bar can be excited with harmonic signals at the longitudinal natural frequency. This makes it possible to achieve particularly high signal amplitudes at the bar end, with a minimum amount of electrical power being introduced.

On the other hand, the actuator can be driven periodically with the same signal. If the drive period is matched to the propagation time of the wave through the bar, the original wave and the respectively newly produced wave are superimposed. This superimposition likewise makes it possible to achieve particularly high signal amplitudes at the bar end, with little electrical power being introduced.

LIST OF REFERENCE SYMBOLS

1 Bar
2 Electromechanical actuator
3 Counterweight
4 Sensor to be calibrated
5 Control line
6 Open-loop and closed-loop control electronics
7 Control line
8 Reference sensor system
9 Coupling mass

The invention claimed is:

1. A method for calibrating acceleration and force sensors by using a Hopkinson bar, comprising:
    a first sub-step of influencing a drive signal to produce an excitation signal matched to a sensor to be calibrated by
        providing a Hopkinson bar having a first end and a second end;
        providing a reference sensor system comprising a reference system sensor at the first end of the Hopkinson bar;
        providing a sensor to be calibrated at the first end of the Hopkinson bar;
        providing an electromechanical actuator capable of converting an electrical signal to a mechanical force at the second end of the Hopkinson bar;
        driving the electromechanical actuator with an initial drive signal produced by control electronics;
        measuring a measurement variable with the reference sensor system, wherein the measurement variable represents a force or an acceleration;
        transmitting an output signal representative of the measured measurement variable from the reference sensor system to the control electronics;
        performing a comparison of the output signal with a defined nominal excitation signal provided by the control electronics;
        generating a distorted drive signal by deliberately distorting the initial drive signal based on results of said comparison, and supplying the distorted drive signal from the control electronics to the electromechanical actuator to obtain the excitation signal at the first end of the Hopkinson bar representing the defined nominal excitation signal; and
    a second sub-step of calibrating the sensor to be calibrated by exciting the sensor to be calibrated by the nominal excitation signal at the first end of the Hopkinson bar.

2. The method according to claim 1, further comprising maximizing an amplitude of an acceleration or a force at the first end of the Hopkinson bar by superimposition of waves generated by the electromechanical actuator.

3. A device for carrying out the method according to claim 1, the device comprising:
    a Hopkinson bar having a first end and a second end;
    a reference sensor system comprising a reference system sensor provided at the first end of the Hopkinson bar measuring a measurement variable representing a force or an acceleration at the first end of the Hopkinson bar;
    a sensor to be calibrated provided at the first end of the Hopkinson bar measuring a measurement variable representing a force or an acceleration at the first end of the Hopkinson bar;
    an electromechanical actuator configured for converting an electrical signal to a mechanical force, the electromechanical actuator fixedly mounted to the second end of the Hopkinson bar;
    control electronics connected to the electromechanical actuator and producing a drive signal for driving the electromechanical actuator;
    the reference sensor system being connected to the control electronics and transmitting to the control electronics the output signal representative of the measurement variable measured by the reference system sensor in response to an initial drive signal provided by the control electronics to the electromechanical actuator; and
    the control electronics configured to generate a distorted drive signal by deliberately distorting the initial drive signal based on results of a comparison of the output signal with the defined nominal excitation signal provided by the control electronics, and configured to supply the distorted drive signal to the electromechanical actuator to obtain the excitation signal representing the defined nominal excitation signal at the first end of the Hopkinson bar.

4. The device according to claim 3, wherein the electromechanical actuator is a piezoelectric actuator.

5. The device according to claim 3, wherein the electromechanical actuator is a magnetostrictive actuator.

6. The method according to claim 1, wherein the second sub-step of calibrating the sensor to be calibrated, further includes, after exciting the sensor to be calibrated by the nominal excitation signal at the first end of the Hopkinson bar:
    measuring a measuring variable of the sensor to be calibrated, wherein the measurement variable represents a force or an acceleration;
    transmitting the measurement variable from the sensor to be calibrated to the control electronics; and
    obtaining a calibration of the sensor to be calibrating by analyzing the nominal excitation signal and measurement variable of the sensor to be calibrated.

7. The method according to claim 1, wherein said distorting comprises influencing a signal form, an amplitude and a pulse duration of the initial drive signal.

8. The device according to claim 3, wherein the sensor to be calibrated comprises a force sensor mounted together with a coupling mass to the first end of the Hopkinson bar, and the measurement variable comprises a force at the first end of the Hopkinson bar.

9. The device according to claim 3, further including a counterweight attached to the electromechanical actuator opposite the Hopkinson bar.

10. The device according to claim 9, wherein the counterweight is shorter than the Hopkinson bar and has a mass greater than $1/100$ of the mass of the Hopkinson bar.

* * * * *